United States Patent [19]

Bruniche-Olsen

[11] 3,836,337

[45] Sept. 17, 1974

[54] LIXIVIATING APPARATUS
[75] Inventor: Henning Anton Bruniche-Olsen, Gentofte, Denmark
[73] Assignee: Aktieselskabet De Danske Sukkerfabrikker, Copenhagen, Denmark
[22] Filed: Aug. 3, 1971
[21] Appl. No.: 168,593

[30] Foreign Application Priority Data
Aug. 4, 1970  Netherlands.................. 7011540

[52] U.S. Cl................................. 23/270 R, 127/5
[51] Int. Cl............................................. B01d 11/02
[58] Field of Search.. 23/270 R, 270 B, 310, 267 R; 127/2–6, 45

[56] References Cited
UNITED STATES PATENTS
| 813,078 | 2/1906 | Bernhardt | 23/270 B |
| 820,074 | 5/1906 | Spelman | 127/6 |
| 2,004,056 | 6/1935 | Pipkin | 127/2 |
| 3,274,924 | 9/1966 | Walker | 23/270 B |
| 3,355,260 | 11/1967 | Bruniche-Olsen | 23/270 R |
| 3,501,345 | 3/1970 | Kaether | 23/270 B |
| 3,697,324 | 10/1972 | Steele | 127/2 |

FOREIGN PATENTS OR APPLICATIONS
| 504,239 | 7/1954 | Canada | 127/6 |
| 10,330 | 11/1932 | Australia | 127/5 |

Primary Examiner—Norman Yudkoff
Assistant Examiner—S. J. Emery
Attorney, Agent, or Firm—Watson, Cole, Grindle & Watson

[57] ABSTRACT

In a lixiviating apparatus comprising an inclined lixiviating trough having means for supplying disintegrated material at its lower end, two screw conveyors for transporting the disintegrated material from the lower end of the trough towards its upper end, means for discharging lixiviated material at its upper end, means for introducing lixiviating liquid at the upper end of the trough and means for removing enriched lixiviating liquid from its lower end, and two pressing devices for successive removal of liquid from the lixiviated material and means for recycling the pressed-off liquid to the trough, said first pressing device comprising a lower rotatable cylinder having a cylinder wall which is pervious to liquid and a rotatable pressure cylinder co-operating with said lower cylinder.

2 Claims, 4 Drawing Figures

LIXIVIATING APPARATUS

BACKGROUND OF THE INVENTION

This invention relates to an apparatus for the continuous extraction by lixiviation of a substance soluble in a lixiviation liquid, in the following referred to as "extractable substance," from a disintegrated material insoluble in said lixiviating liquid but pervious thereto, in the following referred to as "material," said apparatus comprising a lixiviation device comprising means for supplying disintegrated starting material and lixiviation liquid to longitudinally spaced zones of said device, means for transporting said disintegrated material through said lixiviation device in counter-current with said lixiviating liquid, means for removing lixiviated material and enriched lixiviating liquid from inversely spaced zones of said device, at least two devices for subjecting the lixiviated material to successive pressing operations to remove liquid from the lixiviated material and means for recycling pressed-off liquid to said container.

In a prior apparatus of the type described above the two means for subjecting the lixiviated material to successive pressing operations consist of two or more successively mounted roller mills, each consisting of three rollers.

In the roller mill in such an apparatus the rollers are solid. Therefore, large amounts of lixiviating liquid have to be forced backwards through the incoming material. Thus, the pressure between the rollers must be high. In case this pressure is insufficiently high, the liquid will pass through the roller nip and will be reabsorbed in the pressure-relieved material.

However, the use of high pressures is energy-consuming. Furthermore, when using high pressures, the introduction of the very moist material in the nip between the rollers may present serious difficulties.

It has now been discovered that by facilitating the drainage of liquid from the lixiviated material the pressing of the lixiviating liquid backwards through the incoming material can be avoided. Thus, the pressure required and consequently the energy-consumption can be significantly reduced. At the same time the introduction of the moist lixiviated material in the nip between the rollers is facilitated.

SUMMARY OF THE INVENTION

Based on this discovery there is provided according to the invention an apparatus which is characterized by the fact that the first device for pressing off liquid from the disintegrated material consists of a lower rotatable cylinder connected to a driving means and having a cylinder wall which is pervious to liquid, and an upper rotatable pressure cylinder co-operating with said lower cylinder.

When using the apparatus according to the invention, the extracted material removed from the lixiviating container is introduced into the zone between said two cylinders. During the passage through said zone the material is subjected to a pressure corresponding to the weight of the pressure cylinder and its location relative to the lower cylinder.

In some cases, it may be desirable to use an upper pressure cylinder having means for increasing the pressure between said upper pressure cylinder and the lower cylinder.

When subjected to said pressing operation, liquid is pressed off and said liquid passes through the openings in the cylinder wall. In said cylinder the liquid flows against the lower portion thereof and passes out through said cylinder to a collecting container mounted below the cylinder. During the passage of the liquid through the openings in the lower portion of the cylinder these openings are cleaned so that disintegrated material which has been pressed into said openings and has been carried along with the cylinder is removed together with the liquid. Therefore, the cylinder is self-cleaning to a high extent.

In an embodiment of the apparatus according to the invention the lower cylinder consists of a great number of juxtaposed closely spaced parallel rings. Thus, narrow openings are formed between said rings and the pressed-off liquids can pass through said openings into the cylinder and from the lower portion of the cylinder through the cylinder wall and into the collecting container. The rings are preferably of a shape such that the openings between the rings have a cross-sectional configuration corresponding to that of a double funnel. This cross-sectional configuration facilitates the removal of the liquid by pressing from the disintegrated material and the removal of disintegrated material which may be pressed into the openings between the rings.

In order to avoid that higher amounts of disintegrated material than strictly necessary is introduced into the collecting container, the apparatus according to the invention is preferably provided with a scraper mounted between the pressing zone and the collecting container.

In a further preferred embodiment of the apparatus of the invention the pressure cylinder is pivotally mounted relative to the lower cylinder. Thus, the lixiviated material is subjected to substantially the same pressure irrespective of variations of the rate of supplying lixiviated material to the zone between said two cylinders.

In a further preferred embodiment of the apparatus according to the invention the surface of the pressure cylinder has a shape corresponding to that of the surface of the lower cylinder. In this manner a particularly efficient removal of liquid from the disintegrated material by pressing is obtained, and the introduction of the material supplied to the nip between the two cylinders is facilitated.

The liquid which is removed from the disintegrated material in the zone between said cylinders is preferably recycled to the lixiviating container and is introduced therein as a secondary lixiviating liquid.

Compared to the typical apparatus of the above mentioned well known type, the energy consumption is reduced to a value which is slightly above 50 percent of the consumption of a prior art apparatus while obtaining a final product having essentially the same moisture content.

BRIEF DESCRIPTION OF THE DRAWINGS

The invention will in the following be described in further detail with reference to the accompanying drawings in which FIG. 1 diagrammatically illustrates a preferred embodiment of the apparatus according to the invention.

DESCRIPTION OF THE PREFERRED EMBODIMENTS.

Figure 1:
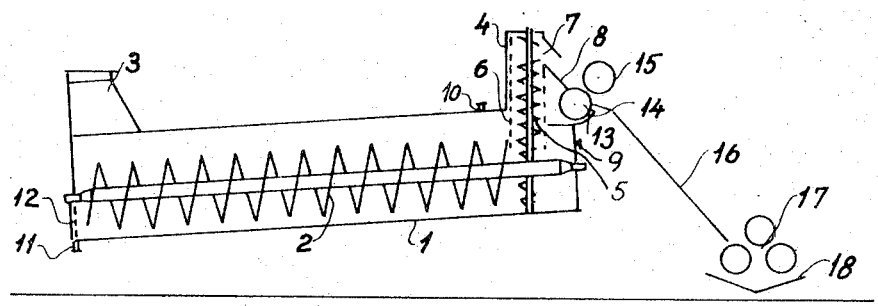

The apparatus illustrated in FIG. 1 comprises a trough 1 disposed at a slight inclination to horizontal and containing two screw conveyors 2 of which only one is shown. The trough 1 has a supply funnel for disintegrated material and a discharge funnel 4 comprising a vertical screw conveyor 5 mounted in a housing 6. The discharge funnel 4 has at its top a discharge opening 7 which is connected to a slide 8. The lixiviation container furthermore comprises two inlet openings 9 and 10 for primary and secondary lixiviating liquid, respectively, and a liquid outlet 11 for lixiviating liquid enriched with extractable substance. The discharge opening 11 is mounted behind a screen 12.

At the upper end of the container 1 and communicating with the slide 8, a device for pressing off liquid is mounted. This device consists of a lower cylinder 13 which is pervious to lixiviating liquid, a liquid collecting tray 14 mounted below said lower cylinder 13 and a pressure cylinder 15. The apparatus shown in FIG. 1 also comprises a conveying means 16 passing material which has been subjected to treatment in the pressing device to a three-roller mill 17. A liquid collecting tray 18 is located below said roller mill.

Figure 2:
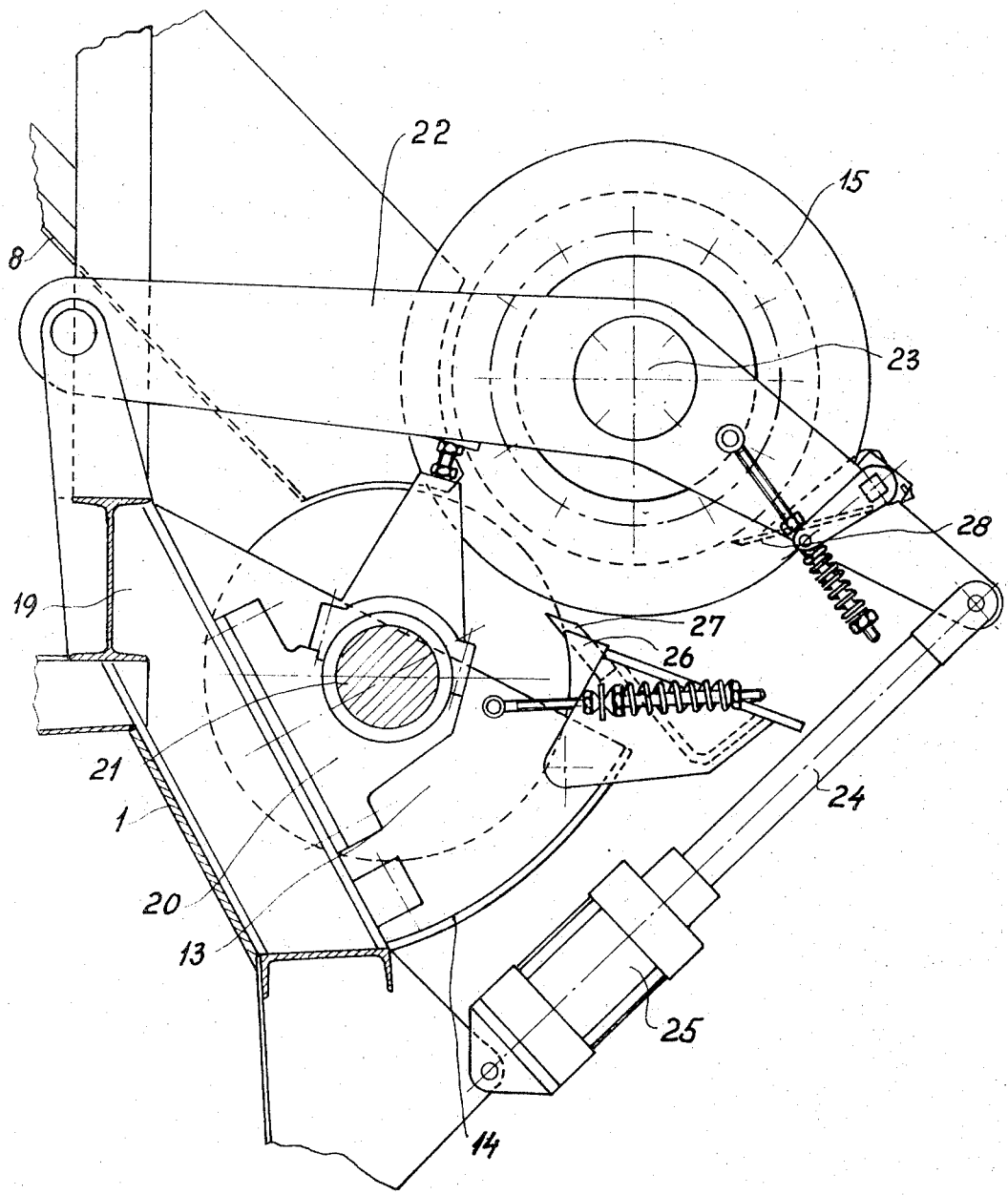
FIG. 2 illustrates the first device for removing liquid by pressing in the apparatus illustrated in FIG. 1, in side view.

As will appear from FIG. 2 the device for pressing off liquid is mounted at the trough 1 and comprises a bearing bracket 19 supporting a bearing 20 for the lower cylinder 13 which is rotatable about an axis 21. A pivotable arm 22 is pivotally connected to the bracket 19 and comprises a bearing for the axis 23 of the pressure cylinder 15. At the upper end of said arm 22 it is connected to a piston rod 24 in a pressure cylinder 25 which is pivotally connected to the trough 1. As illustrated in FIG. 2 the apparatus also comprises a spring-loaded scraper 26 which is maintained at a short distance from the lower cylinder 13. The scraper is provided with protruding teeth 27 which are inserted in the spaces between the rings forming the lower cylinder.

Similarly, a spring-loaded scraper 28 is provided at the pressure cylinder 15.

Figure 3:
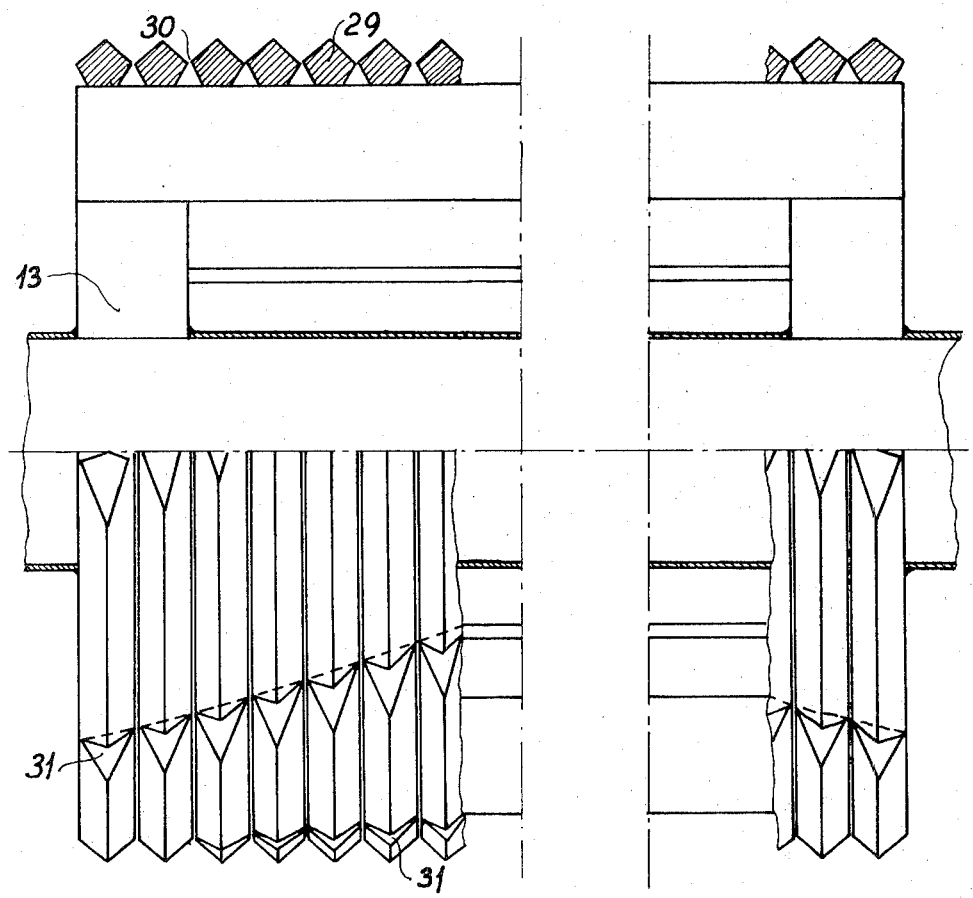
FIG. 3 illustrates, partially in longitudinally section, the lower cylinder in the pressing device illustrated in FIG. 2.

As will appear from FIG. 3 the lower cylinder 13 consists of a great number of closely spaced pentagonal rings 29 forming passages 30 between said rings. Each ring is provided with several incisions 31 serving as carrier means for the material which is contacted with the cylinder 13. In order to avoid that the scraper 26 is introduced in said incisions 31 and blocks the rotation of the cylinder 13, these incisions 31 are provided in such a manner that a line through said incisions forms an angle to the generatrices of the cylinder.

Figure 4:
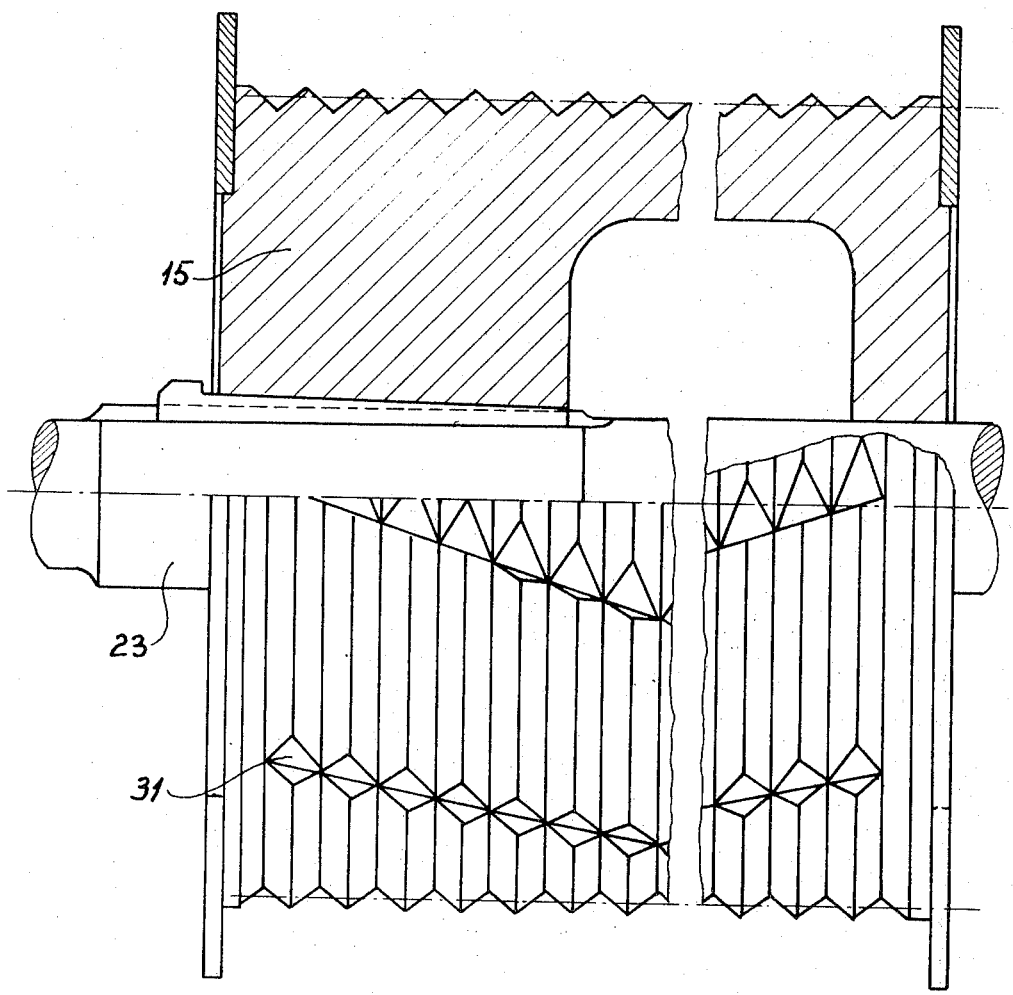
FIG. 4 illustrates, partially in longitudinally section, the pressure cylinder of the pressing device illustrated in FIG. 2.

As will appear from FIG. 4 the pressure cylinder 15 has a grooved surface of a shape corresponding to the surface of the lower cylinder 13. The angle between cylinder surfaces and the surfaces forming the grooves is greater in the lower cylinder 13 than in the upper cylinder 15 in order to press the liquid towards the passages 30 in the lower cylinder 13. The pressure cylinder 15 is also provided with a number of incisions 31 which are located on a line forming an angle with the generatrices of the cylinder.

The operation of the apparatus shown is as follows:

After being introduced through the supply funnel 3, the disintegrated material is transported towards the upper end of the trough 1 by means of the screw conveyor 2. During this movement lixiviating liquid which is introduced through the inlet openings 9 and 10 is passed counter-current with the disintegrated material so as to extract the extractable substance therefrom. The lixiviating liquid which is enriched with extractable substance is discharged through the opening 11. At the upper end of the trough 1 the disintegrated material is lifted up from the trough by means of the screw conveyor 5 and is passed through the housing 6 to the upper end of the screw conveyor 5 which transports the material through the opening 7 into the slide 8. The material passes along the slide 8 towards the lower cylinder 13 and the pressure cylinder 15. Due to the contact between the incisions 31 and the disintegrated material, the latter is passed through the zone between the lower cylinder 13 and the pressure cylinder 15 and is subjected to a pressure which is determined by the weight of the pressure cylinder 15 and its location relative to the lower cylinder 13. Thus, pressure may be increased by means of the pressure cylinder 25. Furthermore, the structure disclosed presents the advantage that the pressure cylinder may move freely upwards and downwards by rotation of the arm 22 about its axis of rotation dependent on the amounts of materials introduced between the cylinders. Under the influence of the pressure exerted in the zone between the two cylinders, the liquid is pressed off from the material and passes through the opening 30 in the cylinder wall into the interior of said cylinder. The liquid flows towards the lower portion of the cylinder and passes in an opposite direction through the cylinder wall in order to be collected on the liquid collecting tray 14. From this tray 14 the liquid pressed off is recycled to the trough 1 as a secondary lixiviating liquid. When the lower cylinder is located as high as illustrated in the drawings, no special devices for transporting the liquid to the trough are required because it flows into said trough under the influence of gravity.

Since the liquid flows out of the lower cylinder in a direction which is opposite to the direction in which it was introduced in said cylinder, the openings 30 are cleaned. Material which adhere to the surface of the lower cylinder 13 is removed from the latter when those parts of the cylinder to which the material adheres passes the zone above the tray by means of the scraper 26 having protruding teeth 27. In a similar manner the material adhering to the pressure cylinder is removed by means of the spring-loaded scraper 28.

When the material has passed the zone between the two cylinders it is coveyed by means of the conveying device 16 to the three-roller mill 17.

I claim:

1. An apparatus for the continuous extraction by lixiviation of a substance soluble in a lixiviating liquid from a disintegrated material insoluble in said lixiviation liquid but pervious thereto, said apparatus comprising a lixiviation trough comprising means for supplying disintegrated starting material to one end of and lixiviation liquid to the other end of said trough, means for transporting said disintegrated material through the lixiviation trough from said one end to said other end in counter-current with said lixiviating liquid, means for removing lixiviated material from said other end and enriched lixiviating liquid from said one end of said trough, conveyor means for transporting the lixiviated material removed from said trough to a dewatering mill, said mill comprising a lower rotatable cylinder connected to driving means and further comprising a large number of closely spaced rings forming narrow slots therebetween, said rings having such a cross-sectional shape that the cross-section of said slots is X-shaped, the surface of each ring being provided with several transverse wedge-shaped incisions on its outer surface, and an upper rotatable pressure cylinder which is pivotably mounted relative to said lower cylinder, the shape of the surface of the pressure cylinder corresponding to that of the lower cylinder, means for recycling water extracted from the lixiviated material by said dewatering mill to said other end of said trough, and a further roller mill for subjecting the dewatered lixiviated material to a further pressing operation to remove additional amounts of water therefrom.

2. An apparatus according to claim 1, characterized in that the co-operating cylinders are located above the point at which the liquid pressed out is introduced into the trough-like container.

* * * * *